United States Patent
Kim et al.

(10) Patent No.: US 12,255,559 B2
(45) Date of Patent: Mar. 18, 2025

(54) SENSORLESS INDUCTION MOTOR SYSTEM AND CONTROL METHOD THEREOF

(71) Applicants: Hyundai Motor Company, Seoul (KR); Kia Corporation, Seoul (KR)

(72) Inventors: Joo Yeon Kim, Seoul (KR); Chang Seok You, Gyeonggi-do (KR); Sung Do Kim, Seoul (KR); Min Su Kang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 354 days.

(21) Appl. No.: 17/977,313

(22) Filed: Oct. 31, 2022

(65) Prior Publication Data

US 2023/0353074 A1  Nov. 2, 2023

(30) Foreign Application Priority Data

Apr. 28, 2022  (KR) .................... 10-2022-0052851

(51) Int. Cl.
*H02P 21/18* (2016.01)
*H02P 6/18* (2016.01)
*H02P 21/26* (2016.01)

(52) U.S. Cl.
CPC .............. *H02P 21/18* (2016.02); *H02P 21/26* (2016.02); *H02P 6/18* (2013.01)

(58) Field of Classification Search
CPC ............. H02P 21/18; H02P 21/26; H02P 6/18
See application file for complete search history.

(56) References Cited

U.S. PATENT DOCUMENTS

| | | | |
|---|---|---|---|
| 2018/0226908 A1* | 8/2018 | Masolov | H02P 9/08 |
| 2020/0106375 A1* | 4/2020 | Miura | H02P 27/06 |

FOREIGN PATENT DOCUMENTS

KR   10-2021-0137757 A   11/2021

OTHER PUBLICATIONS

Shin Nakashima, et al. (2000). Sensor-less Initial Rotor Position Estimation of Surface Permanent-Magnet Synchronous Motor. IEEE Transactions on Industry Applications. 36(6): 1598-1603.

\* cited by examiner

*Primary Examiner* — Zoheb S Imtiaz
(74) *Attorney, Agent, or Firm* — Fox Rothschild LLP (57) ABSTRACT

Disclosed are a sensorless induction motor system including a controller configured to control operation of a motor by controlling a voltage applied to each phase of a stator, to set a stop waiting time expected to be required for the rotor to stop during stop control of the motor, to apply a pulse voltage to each phase of the stator a plurality of times after the stop waiting time, and to determine that the rotor is stopped when rotor position vectors having largest induced current deviations are observed as the same rotor position vector, and a control method thereof.

16 Claims, 6 Drawing Sheets

SENSORLESS INDUCTION MOTOR SYSTEM AND CONTROL METHOD THEREOF

CROSS-REFERENCE TO RELATED APPLICATION

This application claims under 35 U.S.C. § 119(a) the benefit of and priority to Korean Patent Application No. 10-2022-0052851, filed on Apr. 28, 2022, in the Korean Intellectual Property Office, the entire disclosure of which is incorporated herein by reference.

BACKGROUND

1. Field

The present disclosure relates to a sensorless induction motor system and a control method thereof which can prevent response delay of a sensorless induction motor and prevent generation of overcurrent and control failure due to incorrect position estimation by accurately identifying a stop completion time and a stop position of a rotor without a sensor.

2. Description of the Related Art

Induction motors are used in various fields, and in particular, are used in air compressors of fuel cell vehicles. In order to reduce the package size and weight of an air supply system, an air compressor applied to a fuel cell system has an inverter and a motor integrated with each other.

In such an integrated air compressor, a sensorless control method, which is a method of estimating the position of a rotor without a Hall sensor, can be applied. However, since the sensorless control method has low estimation performance at a low velocity, velocity control may not be performed at a certain velocity or lower.

In addition, stopping time of the air compressor largely depends on a mechanical design deviation, the age of the air compressor, friction due to rotational heat in the air compressor, and characteristics of the inertia. Therefore, if the stopping time of the air compressor is set to be short, incorrect vector values may cause incorrect identification of the position of the rotor and sensorless control failure due to incorrect identification. If the stopping time is set to be excessively long, acceleration delay may occur when the air compressor is restarted.

SUMMARY

Therefore, the present disclosure has been made in view of the above problems. It is an object of the present disclosure to provide a sensorless induction motor system and a control method thereof which can prevent response delay of a sensorless induction motor and prevent generation of overcurrent and control failure due to incorrect position estimation by accurately identifying a stop completion time and a stop position of a rotor without a sensor.

In accordance with the present disclosure, the above and other objects can be accomplished by the provision of a sensorless induction motor system, including a motor including a stator having windings forming a plurality of phases and a rotor having a permanent magnet, and a controller. The controller may be configured to: control operation of the motor by controlling a voltage applied to each phase of the stator, set a stop waiting time expected to be required for the rotor to stop during stop control of the motor, apply a pulse voltage to each phase of the stator a plurality of times after the stop waiting time, and determine that the rotor is stopped when rotor position vectors having largest induced current deviations are observed as a same rotor position vector.

In various embodiments, the controller may be further configured to set the stop waiting time based on a time when a rotational velocity of the rotor is reduced to a reference velocity during stop control of the motor.

In various embodiments, the controller may be further configured to calculate an instantaneous deceleration slope at a point in time when the rotational velocity of the rotor is reduced to the reference velocity and set the stop waiting time according to the calculated instantaneous deceleration slope.

In various embodiments, the stop waiting time may be determined based on a time period between a first time when the rotational velocity of the rotor is reduced to the reference velocity until a second time when the rotor is stopped according to the instantaneous deceleration slope.

In various embodiments, the controller may be configured to determine a position of the rotor in a stop state according to the rotor position vector having the largest induced current deviation.

In various embodiments, the controller may be further configured to determine if rotor position vectors having largest induced current deviations are not observed as a same rotor position vector, and re-apply the pulse voltage to each phase of the stator a plurality of times after a measurement period and determine whether rotor position vectors having largest induced current deviations are identical.

In various embodiments, the measurement period may be varied according to the instantaneous deceleration slope calculated at the point in time when the rotational velocity of the rotor is reduced to the reference velocity.

In various embodiments, the measurement period may increase as a magnitude of the instantaneous deceleration slope decreases.

In various embodiments, the controller may be further configured to determine if rotor position vectors having largest induced current deviations are observed as a same rotor position vector, re-apply the pulse voltage to each phase of the stator, and verify whether a rotor position vector having a largest induced current deviation is the same as the previously observed position vector.

In various embodiments, the controller may be further configured to: apply the pulse voltage in a direction in which magnetic fields are canceled when applying the pulse voltage to each phase of the stator after the stop waiting time.

In accordance with another aspect of the present disclosure, there is provided a method for controlling a sensorless induction motor system including a motor composed of a stator having windings forming a plurality of phases and a rotor having a permanent magnet, and a controller configured to control operation of the motor by controlling a voltage applied to each phase of the stator. The method include the steps of, starting, by the controller, stop control of the motor, setting, by the controller, a stop waiting time expected to be required for the rotor to stop, applying, by the controller, a pulse voltage to each phase of the stator a plurality of times after the stop waiting time, deriving, by the controller, a rotor position vector having a largest induced current deviation according to application of the pulse voltage a plurality of times, and determining, by the controller, that the rotor is stopped when a plurality of derived rotor position vectors is identical.

In various embodiments, the setting of the stop wait time step may further include setting, by the controller, the stop waiting time when a rotational velocity of the rotor is reduced to a reference velocity during stop control of the motor.

In various embodiments, the setting of the stop waiting time step may further include calculating, by the controller, an instantaneous deceleration slope at a point in time when the rotational velocity of the rotor is reduced to the reference velocity and setting the stop waiting time according to the calculated instantaneous deceleration slope.

In various embodiments, the determining that the rotor is stopped step may further include determining, by the controller, a position of the rotor in a stop state according to the rotor position vector having the largest induced current variation.

In various embodiments, after the determining that the rotor is stopped step, the method may further include re-applying, by the controller, the pulse voltage to each phase of the stator a plurality of times after the measurement period if rotor position vectors having largest induced current deviations are not identical, and determining, by the controller, whether rotor position vectors having largest induced current deviations are identical.

In another aspect, a vehicle comprising a sensorless induction motor system according to any of the various disclosed embodiments herein may be provided for.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
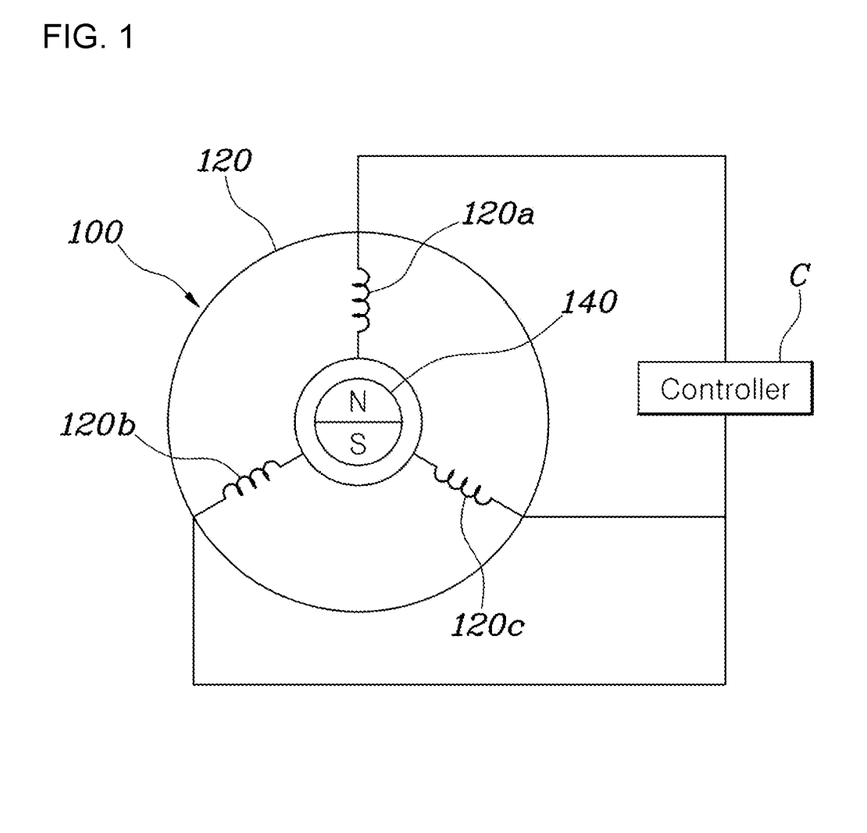
FIG. 1 is a configuration diagram of a sensorless induction motor system according to an embodiment of the present disclosure.
Figure 4:
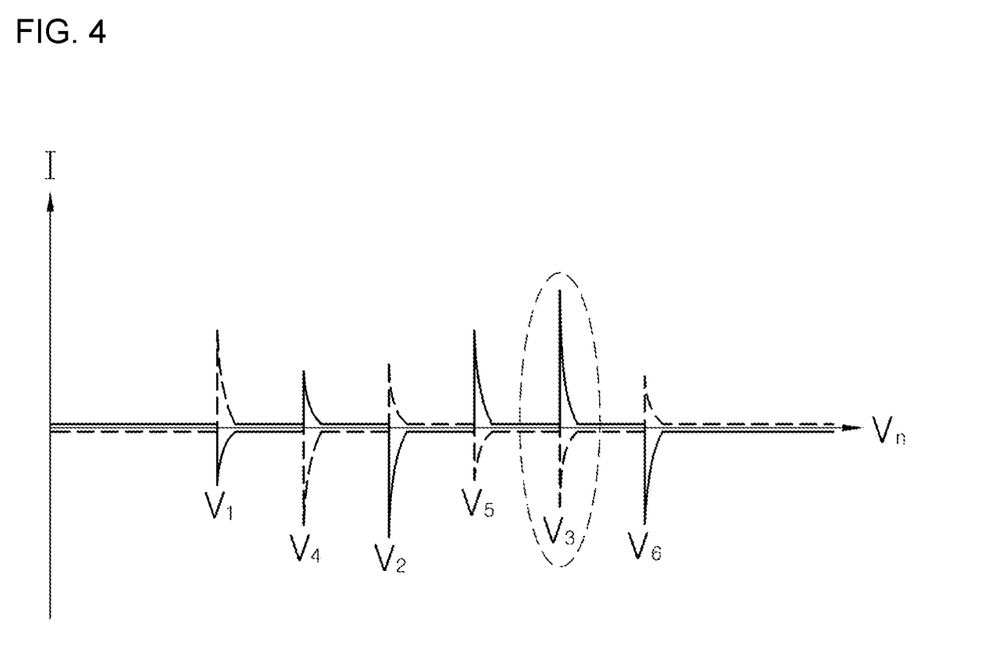
FIG. 4 is a third graph for describing the sensorless induction motor system and a control method thereof according to an embodiment of the present disclosure.
Figure 5:
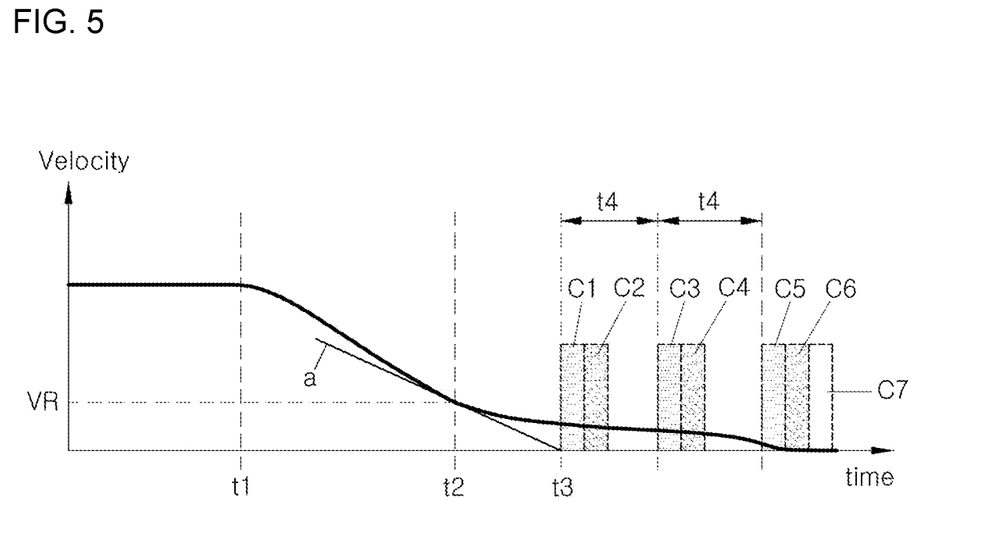
FIG. 5 is a fourth graph for describing the sensorless induction motor system and a control method thereof according to an embodiment of the present disclosure.
Figure 6:
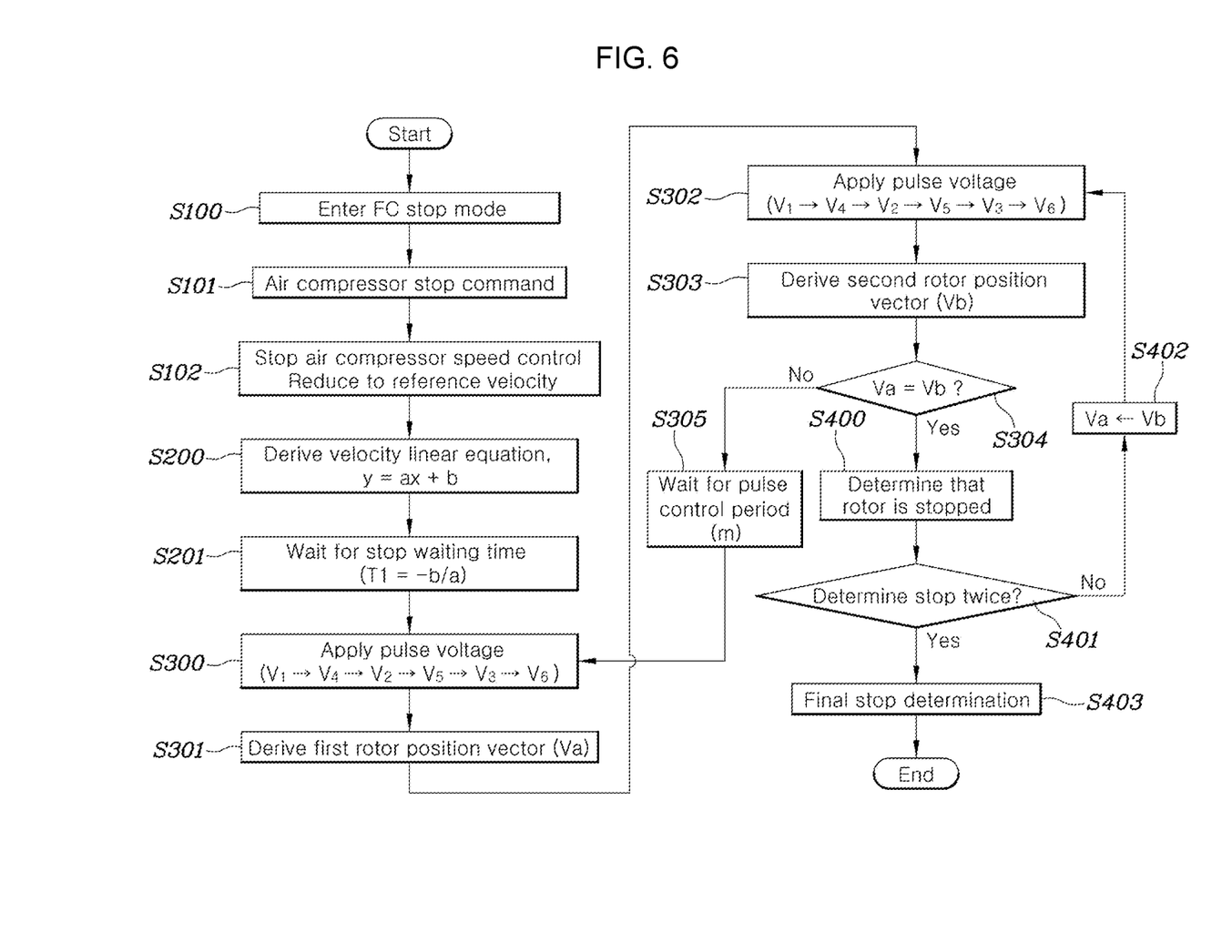
FIG. 6 is a flowchart illustrating a method for controlling the sensorless induction motor system according to an embodiment of the present disclosure.

FIG. 1 is a configuration diagram of a sensorless induction motor system according to an embodiment of the present disclosure, FIGS. 2 to 5 are graphs for describing the sensorless induction motor system and a control method thereof according to an embodiment of the present disclosure, and FIG. 6 is a flowchart illustrating a method for controlling the sensorless induction motor system according to an embodiment of the present disclosure.

FIG. 1 shows a sensorless induction motor system according to an embodiment of the present disclosure. The sensorless induction motor system according to the present disclosure includes a motor 100 composed of a stator 120 provided with windings forming a plurality of phases 120a, 120b, and 120c and a rotor 140 provided with a permanent magnet, and a controller C that controls operation of the motor by controlling a voltage applied to each phase of the stator, sets a stop waiting time expected to be required for the rotor to stop during stop control of the motor, applies a pulse voltage to each phase of the stator multiple times after the stop waiting time, and determines that the rotor is stopped when rotor position vectors having largest induced current deviations are observed as the same rotor position vector.

The induction motor of the present disclosure can be used in various fields, and a typical example is an air compressor of a fuel cell system. Therefore, an induction motor applied to an air compressor will be described below as an embodiment.

In addition, a controller according to an embodiment of the present disclosure may be implemented using a non-volatile memory (not shown) configured to store data relating to an algorithm configured to control operations of various components of a vehicle or software instructions for reproducing the algorithm, and a processor (not shown) configured to perform operations which will be described below using data stored in the memory. Here, the memory and the processor may be implemented as separate chips. Alternatively, the memory and the processor may be implemented as a single chip integrated with each other, and the processor may take the form of one or more processors.

The induction motor 100 of the present disclosure is composed of the stator 120 and the rotor 140, the stator is provided with windings forming a plurality of phases, and the rotor is provided with a permanent magnet. The stator as an embodiment may be composed of U-phase 120a, V-phase 120b, and W-phase 120c each including a winding. The permanent magnet of the rotor 140 includes an N pole and an S pole.

The controller C can drive or stop the rotor of the motor and control a rotational velocity by controlling a voltage applied to each phase.

In particular, an induction motor generally uses a sensor including a Hall sensor in order to determine the velocity of the rotor and to accurately detect the position thereof, but the position and velocity of the rotor of the induction motor are detected without a sensor in the present disclosure. In addition, in the case of a sensorless induction motor of the present disclosure as an embodiment, the principle of estimating a rotor position based on a back electromotive force may be applied.

However, since a sensorless estimation method based on a back electromotive force has poor estimation performance at a low velocity, velocity control is not performed at a certain velocity or lower and a position in a stop state is estimated through voltage injection after waiting for a certain stop time. However, a stop time of the air compressor greatly varies depending on mechanical design deviation, a degree of aging of the air compressor, friction caused by rotational heat, and characteristics of the inertia. Therefore, there is a need for a method for reducing these deviations.

To this end, the controller of the present disclosure sets a stop waiting time predicted to be required for the rotor to stop during stop control of the motor. When the stop waiting time is reached, a pulse voltage is applied to each phase of the stator a plurality of times, and a rotor position vector having a largest induced current deviation is derived a plurality of times. In addition, when a plurality of derived rotor position vectors is observed as the same rotor position vector, it is determined that the rotor is stopped.

Accordingly, it is possible to more accurately detect a position and accurately determine that the rotor is stopped at a low velocity, and accordingly, it is possible to prevent response delay of the motor and to prevent generation of overcurrent and control failure due to incorrect position estimation by accurately detecting a stop completion timing and a stop position of the rotor in the sensorless induction motor without a sensor.

If it is erroneously determined that the motor is stopped although the motor is not completely stopped, and thus the motor is restarted, overcurrent may be generated and control failure may occur, which leads to failure of the motor. Further, if it is erroneously determined that the motor is not stopped although the motor has been stopped, response delay of the motor occurs when the motor is restarted.

Therefore, the present disclosure can determine a complete stop time of the motor relatively accurately, thereby solving the problem caused by erroneous detection of stop time.

Specifically, FIGS. 2 to 5 are graphs for describing the sensorless induction motor system and a control method thereof according to an embodiment of the present disclosure. Determination of stopping of the motor according to the present disclosure will be described with reference to FIGS. 2 to 5.

First, in order to determine a stop time of the rotor, it is necessary to compare induced current deviations in the phases of the stator by applying a pulse voltage to each phase of the stator at a certain period. Since it is necessary to detect a phase having a largest induced current deviation, sampling that emphasizes changes in current is selected and increases in current are compared. However, current deviation between phases is uncertain if the magnitude of induced current is small, and the stopped motor may be caused to rotate in the reverse direction if the magnitude of induced current is large. Accordingly, it is necessary to select a magnitude of a certain voltage and a limit value of the number of times of sampling through experimentation.

Figure 2:
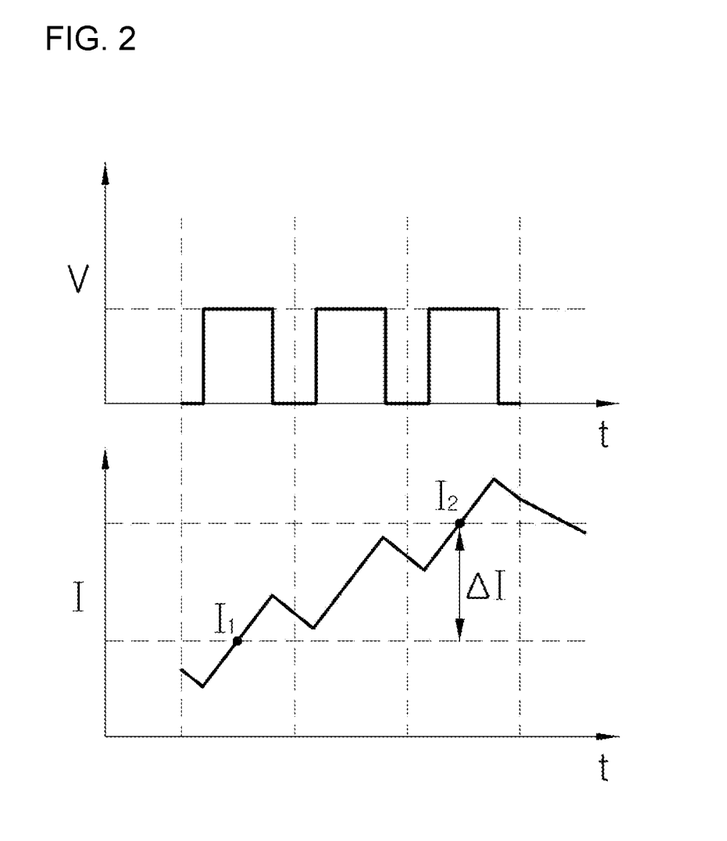
FIG. 2 is a first graph for describing the sensorless induction motor system and a control method thereof according to an embodiment of the present disclosure.

FIG. 2 is a graph showing this process. As shown in FIG. 2, when a pulse voltage is applied, induced current according to the pulse voltage is observed as shown in FIG. 2. A deviation $\Delta I$ between a minimum value I1 and a maximum value I2 of the observed induced current is derived. Then, a position representing a largest deviation $\Delta I$ among a plurality of deviations $\Delta I$ derived for the respective phases can be estimated as a position of the N pole of the rotor.

Figure 3:
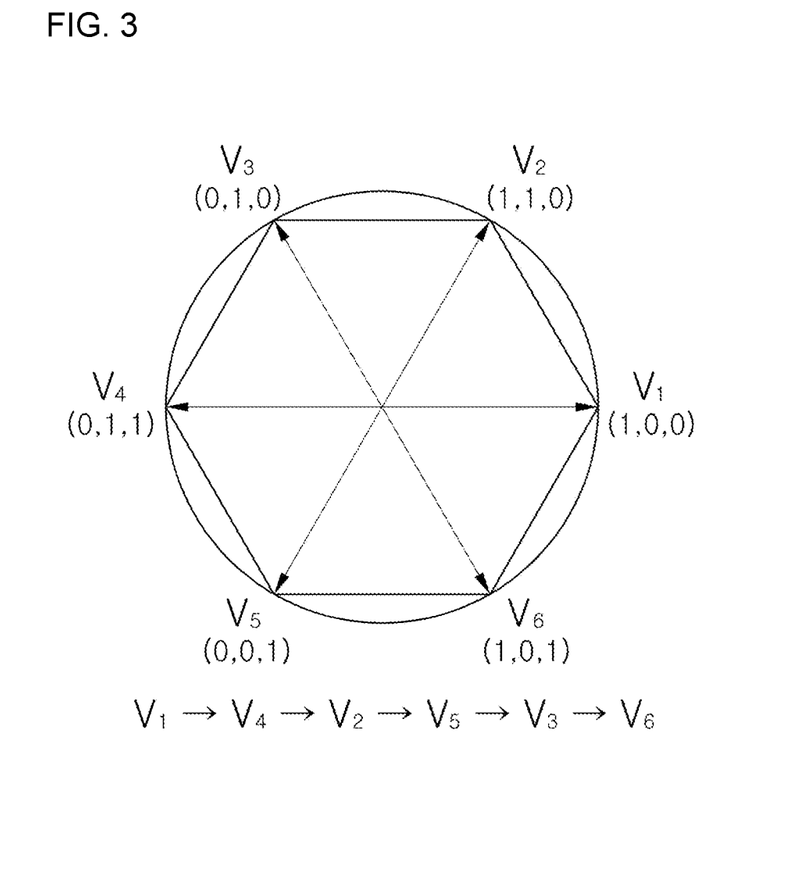
FIG. 3 is a second graph for describing the sensorless induction motor system and a control method thereof according to an embodiment of the present disclosure.

Based on this principle, the order of applying a pulse voltage in a three-phase induction motor will be described. FIG. 3 shows voltage vectors for describing the order of applying a pulse voltage. Voltage vectors in a three-phase induction motor may be represented by V1, V2, V3, V4, V5, and V6 in a counterclockwise direction as shown. In order not to affect a stopped air compressor rotor, the voltage is applied in a direction in which magnetic fields generated due to stop/rotation directions of the rotor and application of the pulse voltage are canceled. Accordingly, the voltage may be applied in the order of V1-V4-V2-V5-V3-V6 in the illustrated example.

As a result of such application of the pulse voltage, a result of generation of induced current as shown in FIG. 4 can be obtained. FIG. 4 shows induced current generated when the pulse voltage is applied in the order of V1-V4-V2-V5-V3-V6. The position where a deviation between a minimum value and a maximum value of the induced current is largest is V3, which shows that the N pole of the rotor is positioned at 120 degrees. That is, when the pulse voltage is applied to each phase of the stator after the stop waiting time, the controller applies the pulse voltage such that magnetic fields are canceled, and as a result, the position of a phase having a largest deviation of the induced current can be identified as the position of the rotor.

When the motor of the air compressor is stopped, induced current deviation values of the respective phases are compared and the position of the phase having the largest value is estimated as the position at the N pole of the rotor. When the motor of the air compressor is driven at a low velocity, the position of the rotor is not determined and thus induced current deviation values are not constant and will continue to change until the motor is stopped. When the motor is completely stopped, the deviation values can be considered to be constant and thus the stop position of the rotor can be correctly identified.

Hereinafter, a detailed process for accurately determining stop of the rotor according to this principle will be described.

First, the controller may set the stop waiting time when the rotational velocity of the rotor is reduced to a reference velocity during stop control of the motor. Since the sensorless method guarantees accuracy up to the reference velocity, prediction is performed from the point in time when the rotational velocity of the rotor has been reduced to the reference velocity.

FIG. 5 shows a process of determining stop of the rotor. When a stop command for the motor is generated (time t1), the controller does not perform velocity control of the motor anymore. Then, the velocity of the rotor starts to decrease. Since the position and velocity of the rotor can be measured up to the reference velocity VR, prediction starts from a time t2 at which the velocity of the rotor reaches the reference velocity VR.

For accurate prediction, an instantaneous slope a of the velocity at time t2 is calculated. That is, the controller may calculate the instantaneous deceleration slope a at the time t2 at which the rotational velocity of the rotor is reduced to the reference velocity VR and set a stop waiting time t2 to t3 according to the calculated instantaneous deceleration slope a.

Specifically, the stop waiting time t2 to t3 may be a time taken from when the rotational velocity of the rotor is reduced to the reference velocity VR until when the rotor is stopped according to the instantaneous deceleration slope a as shown, and is derived as a result value of a linear function as a time at which the rotor is expected to stop. However, there is a high probability that the actual rotor stop time is different from the predicted stop waiting time due to various environmental factors.

Therefore, in order to identify an accurate stop time, the controller determines the position of the rotor in the stop state according to a rotor position vector having the largest induced current deviation. Specifically, the controller applies the pulse voltage to each phase of the stator a plurality of times from a time t3 following the stop waiting time and determines that the rotor is stopped when rotor position vectors having largest induced current deviations are observed as the same rotor position vector. If the rotor is not completely stopped as shown in the graph of FIG. 5, the position vectors derived from C1 and C2 are not identical, which means that the rotor is still rotating.

Therefore, in this case, if rotor position vectors having largest induced current deviations are not observed as the same rotor position vector, the controller may re-apply the pulse voltage to each phase of the stator a plurality of times after a measurement period t4 and determine whether rotor position vectors having largest induced current deviations are identical. This process may be understood as processes C3 and C4 in FIG. 5.

In particular, the measurement period t4 may be varied according to the instantaneous deceleration slope a calculated at the time at which the rotational velocity of the rotor is reduced to the reference velocity. If the instantaneous deceleration slope is steep, it is reasonable to shorten the stop waiting time t2 to t3 and decrease the measurement period t4 by the stop waiting time. However, when the deceleration slope is gentle, the velocity of the rotor is expected to decrease gently and thus it is reasonable to increase the measurement period t4. Accordingly, the measurement period t4 may be increased as the magnitude of the instantaneous deceleration slope a is small. The relationship between the measurement period and the instantaneous deceleration slope may be stored in advance in various formats including functions or tables in the memory of the controller.

On the other hand, when rotor position vectors having largest induced current deviations are observed as the same rotor position vector, the controller may re-apply the pulse voltage to each phase of the stator and verify whether a rotor position vector having a largest induced current deviation is the same as the previously observed position vector. This is the final verification step. As shown in FIG. 5, when it is determined that the position vectors in C5 and C6 are the same, a position vector is finally derived as in C7, and when the position vector in C7 is also the same, verification is completed and it can be determined that the rotor is finally stopped. The reason for this verification is to eliminate an insignificant probability error because, even if the positions of C5 and C6 are determined to be the same, the positions may be determined to be the same by chance after the rotor is rotated.

FIG. 6 is a flowchart illustrating a method for controlling a sensorless induction motor system according to an embodiment of the present disclosure. The method for controlling a sensorless induction motor system according to the present disclosure is a method for controlling a sensorless induction motor system including a motor composed of a stator having windings forming a plurality of phases and a rotor having a permanent magnet, and a controller configured to control operation of the motor by controlling a voltage applied to each of the stator, the method including a step in which the controller starts stop control of the motor, a step in which the controller sets a stop waiting time expected to be required for the rotor to stop, a step in which the controller applies a pulse voltage to each phase of the stator a plurality of times after the stop waiting time, a step in which the controller derives a rotor position vector having a largest induced current deviation according to application of the pulse voltage a plurality of times, and a step in which the controller determines that the rotor is stopped when a plurality of derived rotor position vectors is identical.

First, at the time of entering a stop mode of a fuel cell system (S100), the controller receives a stop command for an air compressor (S101) and stops speed control of an air compressor motor. Accordingly, the rotor of the motor is gradually decelerated and the velocity thereof is reduced to a reference velocity (S102).

In the step of setting the stop waiting time, when the velocity of the rotor is reduced to the reference velocity, the controller may calculate an instantaneous deceleration slope at the point in time when the rotational velocity of the rotor is reduced to the reference velocity (S200) and set the stop waiting time according to the calculated instantaneous deceleration slope (S201).

When the stop waiting time has elapsed, the controller may determine a position of the rotor in a stop state according to a rotor position vector having the largest induced current deviation.

That is, the controller applies the pulse voltage in a predetermined order (S300) and derives a first position vector Va of the rotor (S301). Then, the controller re-applies the pulse voltage (S302) and derives a second position vector Vb of the rotor (S303). Thereafter, the controller determines whether Va and Vb are identical (S304). If rotor position vectors having largest induced current deviations are not identical, the controller re-applies the pulse voltage to each phase of the stator after a measurement period (S305) and determines whether rotor position vectors having largest induced current deviations are identical. The measurement period may be changed according to the instantaneous deceleration slope.

When primary stop determination is performed (S400), Va is replaced with previously derived Vb for minimum verification (S402), Vb is derived again, second stop determination is performed if the replaced Va is identical to Vb (S400 and S401), and final stop determination is performed according to a verification result (S403).

According to the sensorless induction motor system and the control method thereof of the present disclosure, it is possible to prevent response delay of a sensorless induction motor and prevent generation of overcurrent and control failure due to incorrect position estimation by accurately identifying a stop completion time and a stop position of the rotor without a sensor.

Although the example embodiments of the present disclosure have been disclosed for illustrative purposes, those skilled in the art will appreciate that various modifications, additions and substitutions are possible, without departing from the scope and spirit of the disclosure as disclosed in the accompanying claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

As used herein, a "controller" can include one or more of the following components: at least one central processing unit (CPU) configured to execute computer program instructions to perform various processes and methods, random access memory (RAM) and read only memory (ROM) configured to access and store data and information and computer program instructions, input/output (I/O) devices configured to provide input and/or output to the processing controller (e.g., keyboard, mouse, display, speakers, printers, modems, network cards, etc.), and storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium) where data and/or instructions can be stored. In addition, the controller can include antennas, network interfaces that provide wireless and/or wire line digital and/or analog interface to one or more networks over one or more network connections (not shown), a power source that provides an appropriate alternating current (AC) or direct current (DC) to power one or more components of the controller, and a bus that allows communication among the various disclosed components of the controller.

What is claimed is:

1. A sensorless induction motor system, comprising:
a motor including a stator having windings forming a plurality of phases and a rotor having a permanent magnet; and
a controller configured to:
control operation of the motor by controlling a voltage applied to each phase of the stator,
set a stop waiting time expected to be required for the rotor to stop during stop control of the motor,
apply a pulse voltage to each phase of the stator a plurality of times after the stop waiting time, and
determine that the rotor is stopped when rotor position vectors having largest induced current deviations are observed as a same rotor position vector.

2. The sensorless induction motor system according to claim 1, wherein the controller is further configured to set the stop waiting time when a rotational velocity of the rotor is reduced to a reference velocity during stop control of the motor.

3. The sensorless induction motor system according to claim 2, wherein the controller is further configured to:

calculate an instantaneous deceleration slope at a point in time when the rotational velocity of the rotor is reduced to the reference velocity, and
set the stop waiting time according to the calculated instantaneous deceleration slope.

4. The sensorless induction motor system according to claim 3, wherein the stop waiting time is determined based on a time period between a first time when the rotational velocity of the rotor is reduced to the reference velocity until a second time when the rotor is stopped according to the instantaneous deceleration slope.

5. The sensorless induction motor system according to claim 1, wherein the controller is further configured to determine a position of the rotor in a stop state according to the rotor position vector having the largest induced current deviation.

6. The sensorless induction motor system according to claim 1, wherein the controller is further configured to:
determine if rotor position vectors having largest induced current deviations are not observed as a same rotor position vector, and
re-apply the pulse voltage to each phase of the stator a plurality of times after a measurement period and determines whether rotor position vectors having largest induced current deviations are identical.

7. The sensorless induction motor system according to claim 6, wherein the measurement period is varied according to the instantaneous deceleration slope calculated at the point in time when the rotational velocity of the rotor is reduced to the reference velocity.

8. The sensorless induction motor system according to claim 7, wherein the measurement period increases as a magnitude of the instantaneous deceleration slope decreases.

9. The sensorless induction motor system according to claim 1, wherein the controller is further configured to:
determine if rotor position vectors having largest induced current deviations are observed as a same rotor position vector,
re-apply the pulse voltage to each phase of the stator, and
verify whether a rotor position vector having a largest induced current deviation is the same as the previously observed position vector.

10. The sensorless induction motor system according to claim 1, wherein the controller is further configured to apply the pulse voltage in a direction in which magnetic fields are canceled when applying the pulse voltage to each phase of the stator after the stop waiting time.

11. A method for controlling a sensorless induction motor system including a motor composed of a stator having windings forming a plurality of phases and a rotor having a permanent magnet, and a controller configured to control operation of the motor by controlling a voltage applied to each phase of the stator, the method comprising:
starting, by the controller, stop control of the motor;
setting, by the controller, a stop waiting time expected to be required for the rotor to stop;
applying, by the controller, a pulse voltage to each phase of the stator a plurality of times after the stop waiting time;
deriving, by the controller, a rotor position vector having a largest induced current deviation according to application of the pulse voltage a plurality of times; and
determining, by the controller, that the rotor is stopped when a plurality of derived rotor position vectors is identical.

12. The method according to claim 11, wherein the setting of the stop wait time step further comprises setting, by the controller, the stop waiting time when a rotational velocity of the rotor is reduced to a reference velocity during stop control of the motor.

13. The method according to claim 12, wherein the setting of the stop waiting time step further comprises calculating, by the controller, an instantaneous deceleration slope at a point in time when the rotational velocity of the rotor is reduced to the reference velocity and setting the stop waiting time according to the calculated instantaneous deceleration slope.

14. The method according to claim 11, wherein the determining that the rotor is stopped step further comprises determining, by the controller, a position of the rotor in a stop state according to the rotor position vector having the largest induced current variation.

15. The method according to claim 11, further comprising, re-applying, by the controller and after the determining that the rotor is stopped step, the pulse voltage to each phase of the stator a plurality of times after the measurement period if rotor position vectors having largest induced current deviations are not identical, and determining whether rotor position vectors having largest induced current deviations are identical.

16. A vehicle comprising the sensorless induction motor system according to claim 1.

* * * * *